United States Patent [19]

Nixon

[11] 4,378,518

[45] Mar. 29, 1983

[54] RATE BASED AUTOPILOT SYSTEM

[75] Inventor: John M. Nixon, Mineral Wells, Tex.

[73] Assignee: Edo-Aire Mitchell, Mineral Wells, Tex.

[21] Appl. No.: 305,106

[22] Filed: Sep. 14, 1981

Related U.S. Application Data

[63] Continuation of Ser. No. 48,790, Jun. 15, 1979, abandoned.

[51] Int. Cl.³ .......................... B64C 3/18; G05D 1/00
[52] U.S. Cl. ..................................... 318/583; 318/616; 318/636; 244/180
[58] Field of Search ............... 318/580, 583, 636, 564, 318/616, 617; 244/180, 186

[56] References Cited

U.S. PATENT DOCUMENTS

| | | | |
|---|---|---|---|
| 3,686,555 | 8/1972 | Younkin | 318/580 |
| 3,944,171 | 3/1976 | Boone | 244/77 |
| 4,004,206 | 1/1977 | Gompert | 318/636 |
| 4,035,705 | 7/1977 | Miller | 318/564 |
| 4,114,842 | 9/1978 | Hofferber et al. | 244/180 |
| 4,164,340 | 8/1979 | Simpson | 244/186 |

Primary Examiner—B. Dobeck

Attorney, Agent, or Firm—Richards, Harris & Medlock

[57] ABSTRACT

An automatic flight control system for an aircraft having a control surface 28 and including a gyro 12 having an output applied through an attitude filter 14 to the input of a roll rate circuit 16 and a summing amplifier 18. The roll rate circuit 16 generates a rate signal that is applied to a summing amplifier 20 generating a roll rate control signal. The roll rate control signal is input to a roll servo amplifier 22. The servo amplifier 22 combines the rate control signal with a motor velocity signal from a motor velocity detector as part of a roll servomotor 26. Mechanically interconnected to the roll servomotor 26 is the control surface 28 for maneuvering an aircraft about its roll axis. Also, input to the summing amplifier 18 are aircraft command signals from a command block 10 where the authority of such signals is set by a limiter 30. The output of the summing amplifier 18 is applied to a second input of the summing amplifier 20 which generates the rate control signal from a combination of the two input signals applied thereto. For the pitch axis of the aircraft, similar circuitry is interconnected to drive a pitch servomotor 46 that is mechanically interconnected to a control surface 48.

19 Claims, 3 Drawing Figures

RATE BASED AUTOPILOT SYSTEM

This is a continuation of application Ser. No. 048,790 filed June 15, 1979, now abandoned.

TECHNICAL FIELD

This invention relates to a flight control system and more particularly to, a rate based automatic flight control system for an aircraft having a control surface movable with respect to the aircraft.

BACKGROUND ART

Historically, automatic pilots for aircraft, such as described by Lewis et al in U.S. Pat. No. 2,853,671, and Moseley in U.S. Pat. No. 2,126,910, drove an aircraft control surface by means of a motor in response to an attitude signal or a command signal. The motor drives a control surface and a follow-up element serves to rebalance the system. Such systems generally have been characterized by the use of a follow-up element, either mechanical or electrical, which is driven along with the control element. Without such follow-up control an aircraft has often been unstable, particularly in aileron control systems. In such systems, the aircraft oscillates banking back and forth, angles up and down about the pitch axis, the angles dependent upon the particular system and aircraft. The purpose of the follow-up has been to provide damping of such oscillations. This has been accomplished by making the control system deflection proportional to the system error signal, where the system error signal represents the difference between a control or command signal and an attitude or altitude signal. A signal, either a mechanical motion or an electrical signal, proportional to the control surface deflection is fed to a summation point so as to produce a control surface deflection directly proportional to the system error signal. Such aircraft control systems have developed from functionally simple but electromechanically complex systems which were designed so that they could be adapted to a large variety of aircraft types of today's functionally, electronically and mechanically complex systems.

More recently, flight control systems have been developed which employ an open loop drive for the control surface, such as described by Younkin in U.S. Pat. No. 3,686,555. An open loop is provided in which the controlled element is made to follow an input signal without any direct comparison between control element movements and the input signal. This is accomplished by employing a control amplifier which matches the characteristics of the controlled element to the input signal.

In accordance with the present invention, an open loop control is provided wherein a rate signal is generated and compared with a motor velocity signal to generate a motor drive voltage for driving the servomotor to produce a control surface activation rate proportional to the rate signal and the motor velocity signal. A rate circuit responds to an attitude gyro output to generate the rate signal to be combined with the motor velocity signal. The motor velocity signal is provided by a detector responding to motor operation. Thus, the automatic flight control system of the present invention provides an open loop control with improved response.

DISCLOSURE OF THE INVENTION

In accordance with the present invention, an automatic flight control system is provided for an aircraft having a control surface movable with respect to the aircraft to cause movement thereof about a predetermined axis. A rate circuit responds to a control signal that varies with movement of the aircraft about the axis and generates a rate control signal. The control surface is positioned by means of a mechanical linkage to a servomotor that has connected thereto a motor velocity detector that generates as an output a motor velocity signal. A motor drive voltage applied to the servomotor is generated by combining the rate control signal with the motor velocity signal.

Further, in accordance with the present invention, the control signal is generated by an attitude gyro responsive to movement of the aircraft about a roll axis to generate a rate control signal for energizing a servomotor to position an aileron.

Also in accordance with the present invention, the control signal is generated by an attitude gyro responsive to aircraft movement about a pitch axis to generate a rate control signal for energizing a servomotor for driving an elevator control surface.

BRIEF DESCRIPTION OF THE DRAWINGS

For a more complete understanding of the present invention and the advantages thereof, reference may now be made to the following description taken in conjunction with the accompanying drawings.

Referring to the drawings.

DETAILED DESCRIPTION OF THE DRAWINGS

Figure 1:
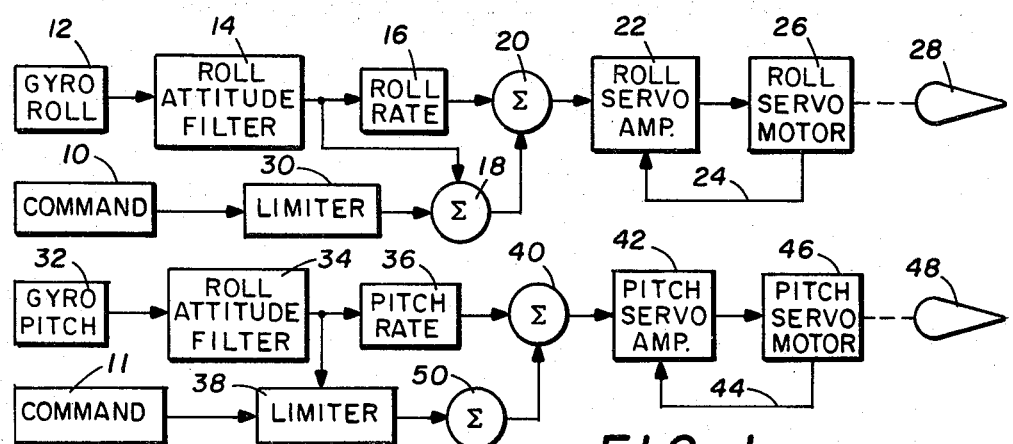
FIG. 1 is a block diagram of an automatic flight control system to cause movement of an aircraft by means of control surfaces about the roll and pitch axis thereof.

Referring to FIG. 1, there is illustrated the basic elements of an automatic flight control system for controlling an aircraft about its roll and pitch axis. It should be understood that a complete automatic flight control system includes automatic stabilization of the aircraft about its yaw, pitch and roll axis, together with apparatus for generating maneuver commands for automatically controlling the aircraft to approach and maintain predetermined flight paths, such as radio beams, and those flight paths defined by altitude and airspeed sensors. Further, automatic flight control systems includes a pitch trim channel for positioning trim tabs on aircraft control surfaces. The apparatus for generating the maneuver commands including the radio coupler equipment, is conventional hardware and is illustrated as command blocks 10 and 11. Command signals output from the command blocks 10 and 11 would include heading error (computed from a radio signal or a directional gyro), attitude error, altitude error and altitude rate and, for guiding an aircraft for a landing approach, glide slope error and glide slope rate. It will be understood that these command signals are generated for the roll and pitch axis of the aircraft or both, by the respective command blocks 10 or 11.

Considering first that part of the automatic flight control system for controlling the roll attitude of an aircraft, a gyro 12, for example, an attitude gyro, provides an output signal that varies in accordance with movement of the aircraft about its roll axis. This output of the attitude gyro 12 is a steady state signal input to an attitude filter 14 that passes selected frequencies of the attitude signal to the input of a roll rate circuit 16 and to one input of a summing/limiter amplifier 18. By operation of the roll rate circuit 16, there is generated at the output thereof a derived roll rate signal having a sufficiently high frequency response to provide stable aircraft control.

The derived rate signal is applied to one input of a summing amplifier 20 that provides a motor velocity command signal to a roll axis servo amplifier 22. A second input to the servo amplifier 22 is a motor velocity signal on a line 24 generated by a motor velocity detector as part of the roll servomotor 26. Thus, two inputs to the servo amplifier 22 are rate based signals that are combined to generate a motor drive voltage applied to the servomotor 26. By conventional mechanism, the output of the roll servomotor 26 is coupled to a control surface 28, namely the ailerons of an aircraft.

What has been so far described is basically an automatic flight control system that generates a derived rate signal for roll axis control of an aircraft, where the derived rate signal is summed with a motor velocity signal to drive a roll servomotor. The system will control an aircraft about the roll axis independent of any position feedback from the control surface 28 as in heretofore conventional automatic flight control systems.

To command a change in the attitude of an aircraft about its roll axis, the command 10 provides a command signal to a limiter 30 having an output connected to a second input of the summing/limiter amplifier 18. The limiter 30 permits the presetting of the level of authority of a command signal to limit an aircraft maneuver. For example, to limit the bank angle of an aircraft for a banking turn maneuver, the limiter 30 provides a means for controlling the bank angle signal into the summing-/limiter amplifier 18 to the level desired for safety and comfort.

An output of the summing/limiter amplifier 18 is a combination of the command signal from the limiter 30 and the control signal of the attitude filter 14. This control/command signal is applied to a second input of the summing amplifier 20. Thus, the output of the summing amplifier 20 is an error signal that is a combination of the derived rate signal from the roll rate circuit 16 and the command/control signal from the summing/limiter amplifier 18. As explained, this is the motor velocity command signal input to the servo amplifier 22.

In most automatic flight control systems, the roll and pitch axis channels have similar hardware and in FIG. 1, the pitch axis channel incorporates basically the same elements as previously described with regard to the roll axis channel. Thus, a gyro 32 responds to movement of an aircraft about its pitch axis to produce a pitch axis control signal input to a filter 34 that is designed to pass a desired range of frequency signals to a pitch rate circuit 36 and to a limiter 38. An output of the pitch rate circuit 36 is a derived rate signal varying with the output of the gyro 32. This derived rate signal is input to a summing amplifier 40 that generates a motor velocity command signal applied to a pitch servo amplifier 42 that receives as a second input a motor velocity signal on a line 44. The line 44 carries the output of a motor velocity detector that is included in the block for illustrating a pitch servomotor 46. The pitch motor 46 is mechanically connected to a control surface 48.

In the servo amplifier 42, the derived rate signal from the summing amplifier 40 and the motor velocity signal on the line 44 are combined into a motor drive voltage for energizing the servomotor 46. Thus, the operation of the pitch axis channel is similar to the roll axis channel as previously described.

Also, input to the pitch axis channel for operating the servomotor 46 are command signals from the command 11 that are applied to the limiter 38, and to one input of a summing/limiter amplifier 50. Typically, commands applied to the pitch axis channel include attitude error, altitude error plus altitude rate, and in an approach mode, glide slope error and glide slope rate. As in the case of the limiter 30, the limiter 38 restricts the authority of certain commands input to the pitch axis channel, which limiter also limits the authority of the control signal from the gyro 32 as output from the pitch attitude filter 34. Again, the authority limit places maximum on angles of flight of an aircraft about the pitch axis.

An output of the summing/limiter amplifier 50 is applied to a second input of the summing amplifier 40. Thus, the summing amplifier 40 produces a signal varying with the error between the output of the derived pitch rate circuit 36 and the output of the summing/limiter amplifier 50.

In addition to circuitry of the commands 10 and 11, the gyros 12 and 32 are conventional hardware providing signals varying with changes in attitude of an aircraft about the selected axis. Similarly, the signal limiters 30 and 38 are conventional hardware and further description of these elements is not deemed necessary for a full understanding of the invention.

Figure 2:
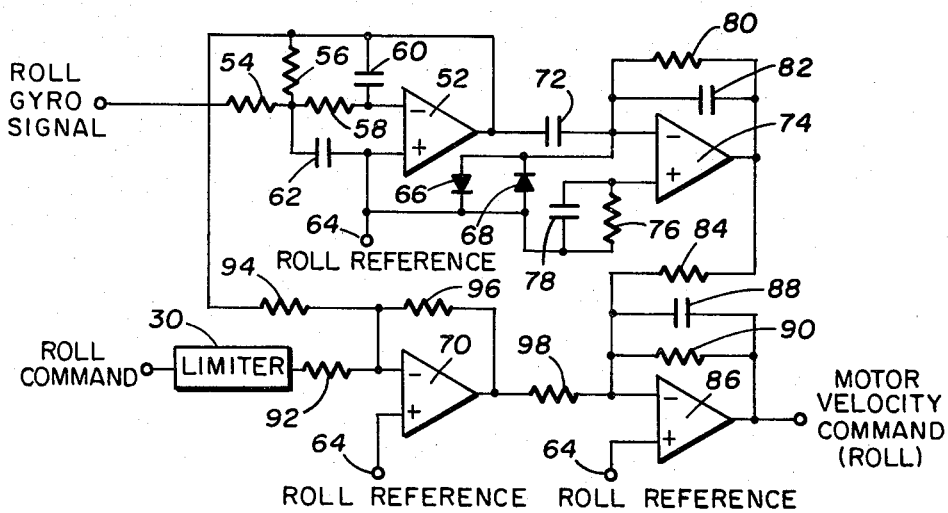
FIG. 2 is a schematic diagram of the system of FIG. 1 for generating a motor velocity command signal to a servo amplifier.
Figure 2:
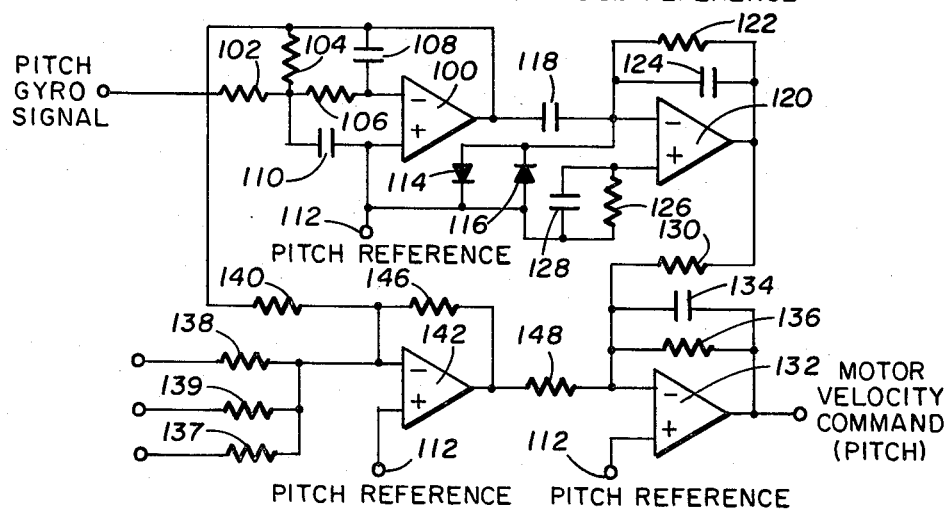

Referring to FIG. 2, there is shown a detailed schematic of the attitude filter, rate circuit, and summing amplifier for both the roll axis channel and the pitch axis channel of FIG. 1. The output of the gyro 12, a roll gyro signal, is input to a differential amplifier 52 as part of the filter 14 through a filter network consisting of resistors 54, 56 and 58 interconnected to capacitors 60 and 62. This filter network is interconnected to the inverting terminal of the amplifier 52. The non-inverting terminal of the amplifier is tied to a roll reference voltage at a terminal 64. An output of the amplifier 52 is applied to the resistor 56 and the capacitor 60. In addition, the output of the amplifier 52 is applied to one input of a differential amplifier 70 as part of the summing amplifier 18.

Also connected to the output of the amplifier 52, through a coupling capacitor 72, is a differential amplifier 74 as part of the roll rate circuit 16. Tied to the input of the amplifier 74 is a signal limiter consisting of diodes 66 and 68. Connected to the non-inverting terminal of the amplifier 74 is an R.C. network consisting of a resistor 76 in parallel with a capacitor 78. This network is interconnected to the roll reference voltage at terminal 64. Connected as a feedback for the amplifier 74 is a resistor 80 in parallel with a capacitor 82.

The derived rate output signal from the amplifier 74 varies with the rate of change of the roll gyro signal and is applied through a resistor 84 to the inverting terminal of a differential amplifier 86 as part of the summing amplifier 20. The non-inverting terminal of the amplifier 86 is tied to the roll reference voltage at terminal 64. Connected between the output of the amplifier 86 and the inverting input terminal is a feedback consisting of a capacitor 88 in parallel with a resistor 90. The output of the amplifier 86 is the motor velocity command signal for the roll axis and is applied to the servo amplifier 22.

A roll command signal from the command 10 is input to the roll axis channel of FIG. 2 through the limiter 30 having an output applied through a resistor 92 to the inverting terminal of the amplifier 70. As mentioned, the output of the amplifier 52 is also input to the amplifier 70, this output is applied to the amplifier through a resistor 94. The non-inverting terminal of the amplifier 70 is tied to the roll reference voltage at terminal 64. A feedback for the amplifier 70 consists of a resistor 96 tied to the junction of resistors 92 and 94 and the output of the amplifier.

By operation of the amplifier 70, a control/command signal is generated at the output of the amplifier and applied through a resistor 98 to the interconnection of the resistors 84 and 90 with the capacitor 88 at the inverting input terminal of the amplifier 86. This control/command signal from the amplifier 70 is then combined with the output of the amplifier 74 in the amplifier 86 to generate the motor velocity command applied to the servo amplifier 22.

Referring to the pitch axis channel of FIG. 2, which is similar to the roll axis channel, a pitch gyro signal is input to an amplifier 100 through a filter network consisting of resistors 102, 104 and 106 along with capacitors 108 and 110 all interconnected to the inverting terminal of the amplifier. Connected to the non-inverting terminal is a pitch reference voltage at a terminal 112; this reference voltage is also applied to the capacitor 110. The output of the amplifier 100 is interconnected to the resistor 104 and the capacitor 108.

An output of the amplifier 100 is applied through a coupling capacitor 118 to an input of an amplifier 120 as part of the pitch rate circuit 36. Also connected to the input of the amplifier 120 is a signal limiter consisting of diodes 114 and 116. The feedback for the amplifier 120 includes a resistor 122 in parallel with a capacitor 124, and a non-inverting terminal of the amplifier is interconnected to an R.C. network consisting of a resistor 126 in parallel with a capacitor 128. The interconnection of the resistor 126 and the capacitor 128 is tied to the pitch reference voltage at terminal 112.

At the output of the amplifier 120 there is generated the derived pitch attitude rate signal applied through a resistor 130 to an input of a differential amplifier 132 as part of the summing amplifier 40. Also connected to the inverting terminal of the amplifier 132 along with the resistor 130 is a feedback consisting of a capacitor 134 in parallel with a resistor 136. The non-inverting terminal of the amplifier 132 is tied to the pitch reference voltage at terminal 112.

The signal generated by the amplifier 132 is the motor velocity command for the pitch axis and is applied to the servo amplifier 42 of FIG. 1.

To command a change in aircraft attitude along the pitch axis the command 11 generates command signals that are selectively input to the limiter 38 by resistors 137 through 139. These resistors are interconnected to the inverting terminal of an amplifier 142 which terminal is also connected to an input resistor 140 tied to the output of the amplifier 100. The inverting terminal of the amplifier 142 is connected to the pitch reference voltage at the terminal 112. A feedback for the amplifier 142 consists of a resistor 146. An output signal from the amplifier 142 is applied through a resistor 148 to the inverting terminal of the amplifier 132.

As illustrated, the resistors 138 through 140 comprise the limiter 38, the amplifier 142 is part of the summing amplifier 50, and the amplifier 132 is part of the summing amplifier 40 with the output of the amplifier 132 connected to the servo amplifier 42.

Figure 3:
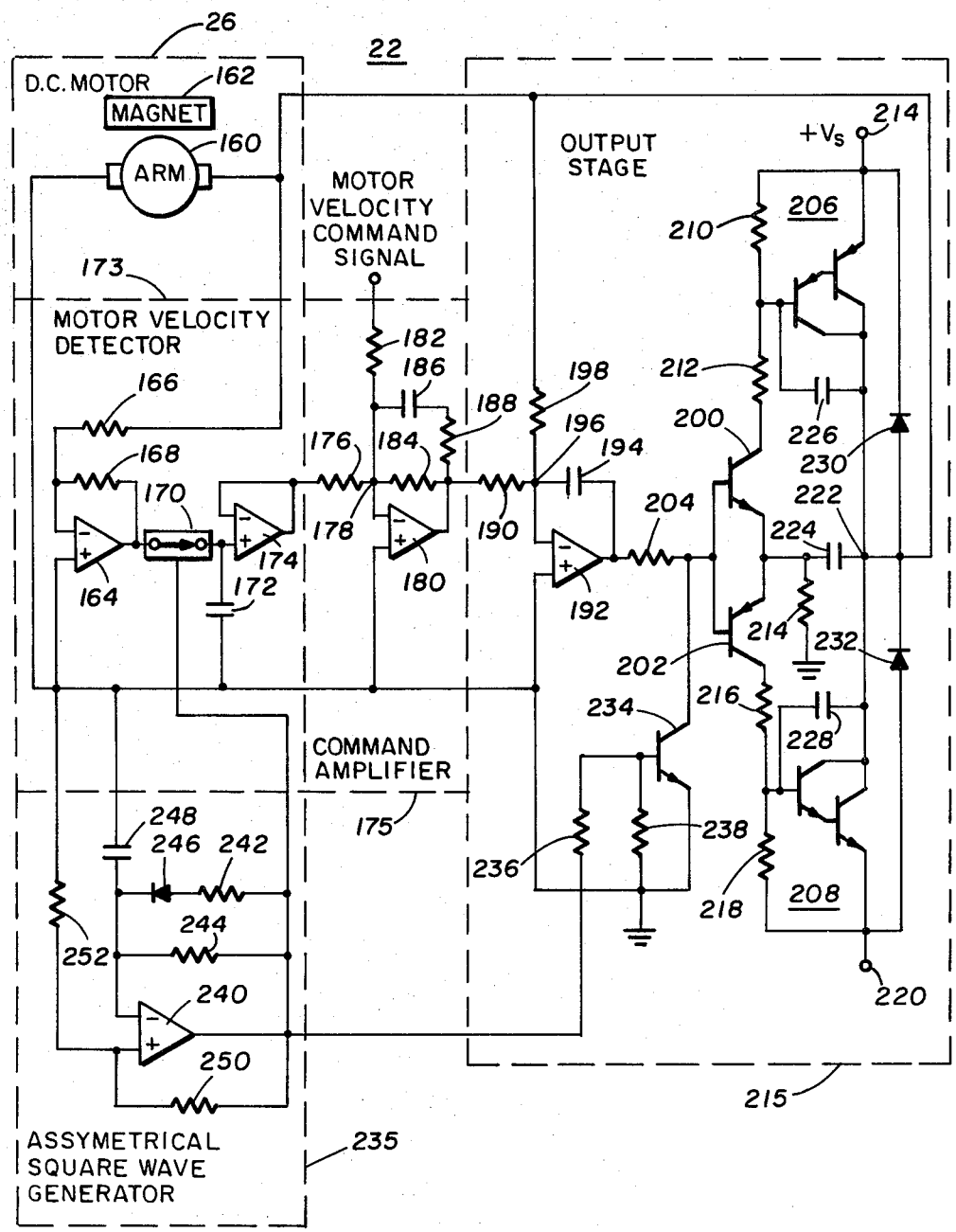
FIG. 3 is a schematic diagram of a servo amplifier for driving a servomotor coupled to an aircraft control surface.

Referring to FIG. 3, there is shown a schematic of the servo amplifier 22 of FIG. 1 where the servomotor 26 includes an armature 160 having a conventional winding. Also included as a part of the servomotor 26 is a permanent magnet 162. One lead from the armature 160 is connected to an input of an inverting amplifier 164 through an input resistor 166. The gain of the amplifier 164 is established by a feedback resistor 168 connected between the output and the input at the resistor 166. The second terminal of the amplifier 164 connects to ground.

An output of the amplifier 164 is applied through a sample switch 170 to a storage capacitor 172. The storage capacitor 172 comprises a hold circuit for a motor velocity detector 173 and stores the back emf voltage from the motor during a sample time interval. This connection of the output of the amplifier 164 to the storage capacitor 172 through the switch 170 occurs only during the sample time interval. During all other times the switch 170 is opened by the removal of a sample time interval signal. During the motor drive time, when the switch 170 is open, the storage capacitor 172 stores the last measured value of the back emf of the servomotor 26.

This stored voltage is applied to one input upon an operational amplifier 174 having a gain determined by the feedback circuit and provides the motor velocity signal applied to one input of a command amplifier 175. This motor velocity signal is applied through an input resistor 176 to a mixing or summing junction 178 as connected to one input of a differential amplifier 180. Also connected to the summing junction 178 is the motor velocity command signal through a resistor 182. Gain of the amplifier 180 is established by a feedback resistor 184 and amplifier response time is established by a network consisting of a capacitor 186 in series with a resistor 188.

By means of the resistor 188—capacitor 186 circuit for the amplifier 180, the A.C. gain of this amplifier is tailored to design characteristics of the servomotor 26 to achieve system stability. Also, by establishing a high gain for the amplifier 180 any low level motor velocity command signal, that is, any small signal difference at the summing junction 178 will cause a very large voltage change to be applied to the servomotor. Note, however, that as soon as the motor begins to respond to the new voltage and generates a new back emf motor velocity signal, which is stored on the capacitor 172, then the error signal at junction 178 decreases to further adjust the voltage applied to the servomotor 26.

A motor drive signal at the output of the amplifier 180, which is proportional to the error signal at the summing junction 178, is applied through an input resistor 190 to an input of a differential amplifier 192. A stabilizing capacitor 194 is connected across the amplifier 192 at a summing junction 196 along with the resistor 190. Also connected to the summing junction 196 is a feedback resistor 198, as will be explained. A second input of the amplifier 192 is grounded.

A voltage generated at the output of the amplifier 192 is applied to base electrodes of transistors 200 and 202 through a base drive resistor 204. Transistors 200 and 202 are driver elements for a pair of output transistors 206 and 208, respectively. Considering first the circuitry connected to transistor 200, it drives a Darlington pair 206 through a voltage divider network including resistors 210 and 212, the former connected to a positive D.C. voltage supply at a terminal 214. The emitter electrode of the transistor 200 is interconnected to the emitter electrode of the transistor 202 and also connected to an emitter resistor 214 as part of the drive circuit for the transistors 200 and 202. Next, considering the transistor 202, it drives a Darlington pair 208 through a divider network including resistors 216 and 218, the latter connected to a negative D.C. voltage supply at a terminal 220.

Both the Darlington pairs 206 and 208 are similar circuits with the collector electrodes interconnected at a junction 222 and through a stabilizing capacitor 224 to the resistor 214. A stabilizing capacitor 226 is connected across the Darlington pair 206 and a stabilizing capacitor 228 is connected across the Darlington pair 208. Connected across the Darlington pair 206 is a clamping diode 230 that protects the transistors of this pair from any inductive surge caused by disconnecting the motor 26 from an energizing source. A similar clamping diode 232 is connected across the Darlington pair 208.

To control the coupling of the power supplies at the terminals 214 and 220 to the D.C. motor 26, the output stage 215 includes an activating transistor switch 234 having a collector electrode connected to the base electrodes of the transistors 200 and 202. The emitter electrode of the transistor 234 connects to ground. The transistor 234 is driven by the motor drive time signal at the output of a square wave generator 235 as applied through an input resistor 236. The drive voltage to the base electrode of the transistor 234 is established by the a bias resistor 238 connected between the base electrode of the transistor 234 and ground.

As previously mentioned, the resistor 198 is a feedback element feeding the output voltage at the Darlington pair 206 and the Darlington pair 208 to the summing junction 196. Basically, the Darlington pairs 206 and 208 provide power amplification for the amplifier 192 and the feeback resistor 198 completes the operational loop. The gain of the entire output stage is determined by the values of the resistors 190 and 198. It is thus possible to characterize the output stage 215 as an operational amplifier with a high output current capability and having the ability of turning off the output by means of the switching transistor 234.

To generate the motor drive time signal to the output stage 215 and the sample time interval signal to the detector 173 the asymmetrical square wave generator 235 includes a free running multivibrator comprising an amplifier 240 having a feedback configuration to the inverting input terminal that includes resistors 244 and 242, with the latter in series with a diode 246. This feedback circuit connects to a capacitor 248. The network 242, 244, 246 and 248 establishes the sample time interval and the motor drive time of the duty cycle for the D.C. motor 26. In a typical configuration of the asymmetrical square wave generator 235, the timing network establishes the duty cycle at 10% sample time and 90% motor drive time. As previously explained, this may be varied depending on the characteristics of the motor 26. Also included in the square wave generator circuit is a feedback that includes a resistor 250 to the non-inverting terminal of the amplifier 240. Also connected to the non-inverting terminal of the amplifier 240 is a grounded input resistor 252.

While only one embodiment of the invention, together with modifications thereof, has been described in detail herein and shown in the accompanying drawings, it will be evident that various further modifications are possible without departing from the scope of the invention.

I claim:

1. An automatic flight control system responsive to a control signal that varies with movement of an aircraft about a predetermined axis, the aircraft having a control surface coupled to a servo motor and movable with respect to the aircraft fuselage to cause movement thereof about a predetermined axis, comprising:
   rate circuit means connected to receive the control signal and generating a derived rate output voltage varying with the control signal;
   first means responsive to the control signal and an aircraft command signal for combining into a control/command signal;
   second means responsive to the control/command signal and to the output voltage of said rate circuit means for combining into a motor vehicle command;
   circuit means connected to the servo motor and responsive to the motor velocity during a motor simple time for generating a motor velocity signal, said circuit means including first means for switching from a first position during a motor drive time to a second position during the motor sample time in response to a sample time interval signal;
   means responsive to the motor velocity signal and the motor velocity command to generate a motor drive signal to command the velocity of said servo motor;
   a power amplifier activated during the motor drive time and responsive to the generated motor velocity command to apply to the motor a voltage at a level proportional to the motor velocity command, said power amplifier including second means for switching from a first position during the motor sample time to hold the amplifier input at a fixed value to a second position during the motor drive time to apply to the motor the voltage proportional to the motor velocity command and thereby command the velocity of the motor in response to a motor time signal; and
   means for generating the sample time interval signal to said first means for switching and for generating the motor time signal to said second means for switching to establish a motor drive time longer than the motor sample time.

2. An automatic flight control system for an aircraft as set forth in claim 1 including means for generating the command signal.

3. An automatic flight control system for an aircraft as set forth in claim 2 wherein said means for generating the command signal includes means for limiting the level of authority of the command signal as applied to said first means for combining.

4. An automatic flight control system for an aircraft as set forth in claim 1 including means responsive to the movement of the aircraft about the predetermined axis to produce the control signal.

5. An automatic flight control system for an aircraft as set forth in claim 4 wherein said means responsive to the aircraft movement includes means for filtering the control signal applied to said first means for combining.

6. An automatic flight control system for an aircraft as set forth in claim 1 including a gyro responsive to the movement of the aircraft about the roll axis to produce a roll control signal.

7. An automatic flight control system for an aircraft as set forth in claim 6 including means for generating an attitude command signal input to said first means for combining.

8. An automatic flight control system for an aircraft as set forth in claim 1 including a gyro responsive to the movement of the aircraft about the pitch axis to produce a pitch control signal.

9. An automatic flight control system for an aircraft as set forth in claim 8 including means for generating an altitude error and an altitude rate command signal.

10. An automatic flight control system for an aircraft as set forth in claim 8 including means for generating a glide slope error and glide slope rate command signal.

11. An automatic flight control system for an aircraft having a control surface coupled to a servo motor and movable with respect to the aircraft fuselage to cause movement thereof about a predetermined axis, comprising:
means for generating a control signal that varies with movement of the aircraft about the predetermined axis;
means for generating a command signal;
means for combining the control signal and the command signal into a control/command signal;
rate circuit means connected to receive the control signal and generating a derived rate output voltage varying with the control signal;
means responsive to the control/command signal and the output voltage of said rate circuit means for combining into a motor velocity command;
circuit means connected to the servo motor and responsive to the motor velocity during a motor sample time for generating a motor velocity signal, said circuit means including first means for switching from a first position during a motor drive time to a second position during the motor sample time in response to a sample time interval signal;
means responsive to the motor velocity signal and the motor velocity command to generate a motor drive signal to command the velocity of said servo motor;
a power amplifier activated during the motor drive time and responsive to the generated motor drive signal to apply to the motor a voltage at a level proportional to the motor velocity command, said power amplifier including second means for switching from a first position during the motor sample time to hold the amplifier input at a fixed value to a second position during the motor drive time to apply to the motor the voltage proportional to the motor velocity command and thereby command the velocity of the motor in response to a motor time signal; and
means for generating the sample time interval signal to said first means for switching and for generating the motor time signal to said second means for switching to establish a motor drive time longer than the motor sample time.

12. An automatic flight control system responsive to a control signal that varies with movement of an aircraft about a predetermined axis, the aircraft having a control surface movable with respect to the aircraft fuselage to cause movement thereof, comprising:
rate circuit means connected to receive the control signal and generating a derived rate output voltage varying with the control signal;
a servo motor;
circuit means connected to the servo motor and responsive to the motor velocity during a motor sample time for generating a motor velocity signal, said circuit means including first means for switching from a first position during a motor drive time to a second position during the motor sample time in response to a sample time interval signal;
means responsive to the motor velocity signal and the output voltage of said rate circuit means to generate a motor drive signal to command the velocity of said servo motor;
a power amplifier activated during the motor drive time and responsive to the generated motor drive signal to apply to the motor a voltage at a level proportional to the motor drive signal, said power amplifier including second means for switching from a first position during the motor sample time to hold the amplifier input at a fixed value to a second position during the motor drive time to apply to the motor the voltage proportional to the motor drive signal and thereby command the velocity of the motor in response to a motor time signal; and
means for generating the sample time interval signal to said first means for switching and for generating the motor time signal to said second means for switching to establish a motor drive time longer than the motor sample time.

13. An automatic flight control system as set forth in claim 12 wherein said circuit means includes means for storing the motor velocity signal generated during the sample time interval.

14. An automatic flight control system as set forth in claim 13 wherein said first means for switching disconnects said means for storing from the servo motor during the motor drive time.

15. An automatic flight control system as set forth in claim 12 wherein said power amplifier includes a first switch actuated by a motor drive signal of a first sense to apply a voltage of a first polarity from a first voltage supply to the motor, and a second switch actuated by a motor drive signal of a second sense to apply a voltage of a second polarity from a second voltage supply to the motor.

16. An automatic flight control system for an aircraft as set forth in claim 13 wherein said means for combining the control signal and the command signal includes a summing amplifier.

17. An automatic flight control system for an aircraft as set forth in claim 16 wherein said means for combining the control/command signal and the rate signal includes a summing amplifier.

18. An automatic flight control system for an aircraft as set forth in claim 13 wherein said means responsive to the movement of the aircraft includes a gyro responsive to movement of the aircraft about the roll axis to produce a roll control signal.

19. An automatic flight control system for an aircraft as set forth in claim 13 wherein said means responsive to the movement of the aircraft includes a gyro responsive to the movement of the aircraft about the pitch axis to produce a pitch control signal.

* * * * *